United States Patent [19]

Voronin et al.

[11] Patent Number: 4,491,715
[45] Date of Patent: Jan. 1, 1985

[54] APPARATUS FOR GAS-SHIELDED ARC WELDING

[75] Inventors: Felix V. Voronin; Igor V. Shergov; Vyacheslav F. Gorb; Viktor V. Sidorov, all of Moscow, U.S.S.R.

[73] Assignee: Nauchno-Proizvodstvennoe Obiedinenie PO Tekhnologii Mashinostroenia, Moscow, U.S.S.R.

[21] Appl. No.: 394,920
[22] PCT Filed: Oct. 30, 1980
[86] PCT No.: PCT/SU80/00180
§ 371 Date: Jun. 28, 1982
§ 102(e) Date: Jun. 28, 1982
[87] PCT Pub. No.: WO82/01492
PCT Pub. Date: May 13, 1982

[51] Int. Cl.³ ............................ B23K 9/16; B23K 9/32
[52] U.S. Cl. .................................. 219/74; 219/124.1; 219/124.34
[58] Field of Search .............. 219/124.34, 130.21, 219/124.1, 124.4, 124.5, 74, 75; 358/100, 101

[56] References Cited

U.S. PATENT DOCUMENTS 3,671,707 6/1972 Cunningham .................. 219/74
3,696,230 10/1972 Friedrich .................... 219/121 L

FOREIGN PATENT DOCUMENTS 2500182 1/1975 Fed. Rep. of Germany .................. 219/124.34

339361 7/1972 U.S.S.R. .

OTHER PUBLICATIONS

A. M. Godridge, "Development and Use of a TV System for Viewing Flames", Conference on the Operation of Instruments in Adverse Environment, 1977, pp. 95-102.

Primary Examiner—C. L. Albritton
Assistant Examiner—Catherine M. Sigda
Attorney, Agent, or Firm—Lilling & Greenspan

[57] ABSTRACT

An apparatus for gas-shielded arc welding comprises a mechanism (1) for guiding and feeding an electrode to a welding zone (3), a nozzle (4) for feeding a protective gas medium to the welding zone (3) and a TV transmission camera (6) for realtime monitoring of the welding process. A cover plate (8) made of an optically transparent material is provided at the end (7) of the gas nozzle (4) which is remote from the welding zone (3), and a lens (9) of the TV camera (6) is installed above the cover plate (8) coaxially therewith. The distance ("a") from the cover plate (8) to the lens (9) is selected in such a manner that the zone (3) of sharpness of the lens is located beyond the edge (11) of the gas nozzle (4) which is adjacent to the welding zone (10) and extends over the components of the welding process.

An apparatus for gas-shielded arc welding is designed preferably for welding thick plate materials, for example, pressure vessel casings.

1 Claim, 5 Drawing Figures

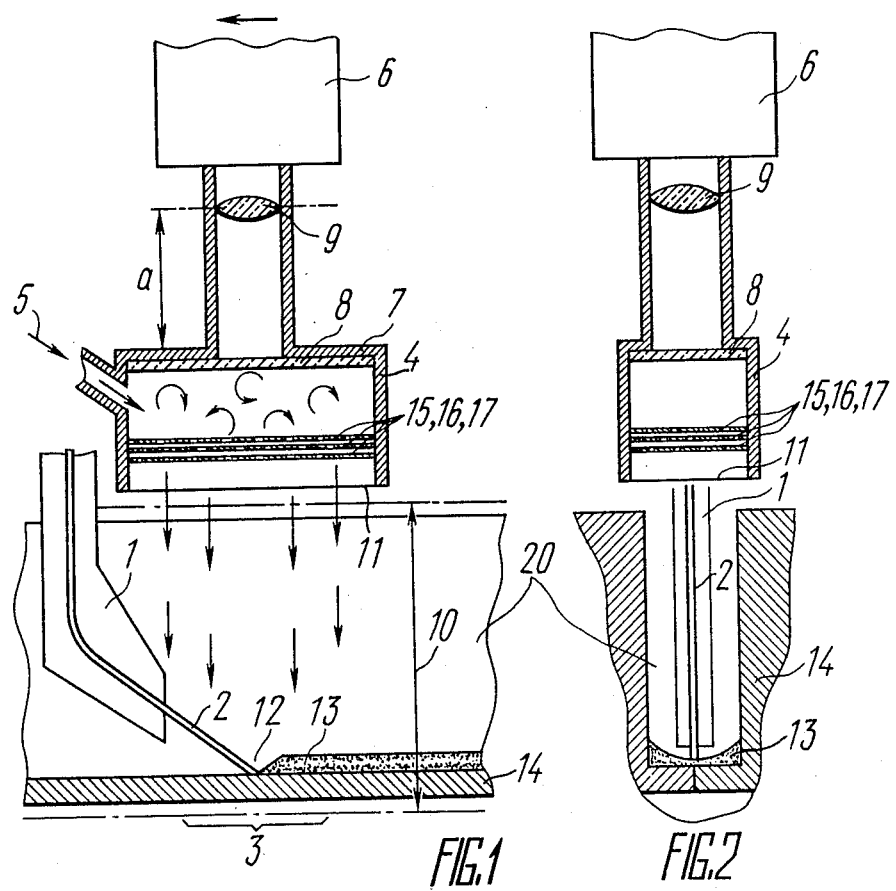

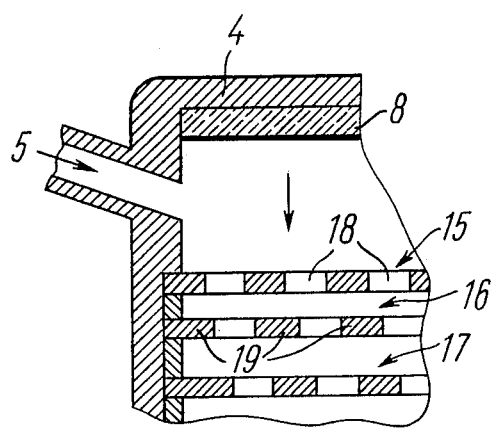
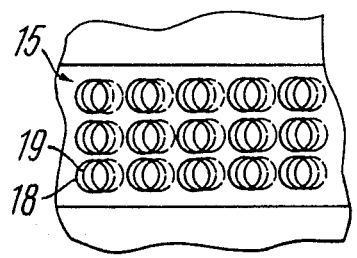
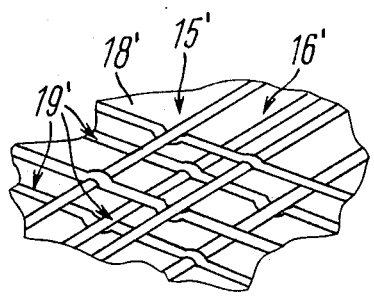

APPARATUS FOR GAS-SHIELDED ARC WELDING

FIELD OF THE INVENTION

The present invention relates to the welding and welding equipment, and more particularly, it deals with apparatus for gas-shielded arc welding.

DESCRIPTION OF THE PRIOR ART

A large number of apparatus for gas-shielded arc welding are known in the art which comprise a mechanism for guiding the electrode and for feeding it to the welding zone, a nozzle for feeding a shielding gas to the welding zone and a TV transmission camera which is employed for obtaining information on the welding performance (cf., for example, an article by I. V. Shergov et al. "Nabludenie protsessa svarki s pomoschju televisionnoi apparatury", magazine "Svarochnoe proizvodstvo", No. 5, 1969, page 24). In the prior art apparatus TV transmission cameras are provided with special attachments enabling the provision of the image of the welding zone in the open-arc welding. The use of this prior art method for welding thick plate materials is not possible since limited size of the groove space between edges of workpieces being welded does not enable an operative visual monitoring of the process, and the installation of a TV camera directly adjacent to the welding bath is impossible.

Known in the art is also an apparatus for gas-shielded arc welding for making long welds in which two TV cameras are used for monitoring the process. (cf., for example, F. V. Voronin, I. V. Shergov "Distantsionnoe vedenie i vizualny kontrol protsessov svarki plavleniem", NIIinformtyazhmash, issue 10-74-2, Moscow, 1974, pages 25-27, FIG. 9).

The employment of such apparatus for welding thick plate materials is also impossible because the TV cameras are made in the form of individual structural components arranged in the front end part of the apparatus. Since welding in a narrow welding groove is accompanied with an intensive directive release of combustion products (soot, smoke), monitoring the process becomes virtually impossible owing to a rapid formation of dust deposit on the surfaces of optical components of TV transmission camera. The absence of monitoring during the welding makes the process impossible owing to a large number of uncontrollable deviations from the performance resulting in flaws in the form of undercuts, slagging, cold welds and the like.

DISCLOSURE OF THE INVENTION

The invention is based on the problem of providing an apparatus for gas-shielded arc welding of thick plate materials with TV monitoring of the conditions in the welding zone and deviations from preset welding conditions during the welding.

This problem is solved by that in an apparatus for gas-shielded arc welding, comprising a mechanism for guiding and feeding an electrode to the welding zone, a nozzle for feeding a shielding gas to the welding zone and a TV transmission camera for monitoring the welding performance, according to the invention, a cover plate made of an optically transparent material is provided at the end of the nozzle remote from the welding zone, and a lens of the TV transmission camera is installed on the cover plate coaxially with the nozzle, the distance from the cover plate to the lens being selected in such a manner that the zone of sharpness of the lens is located beyond the edge of the nozzle adjacent to the welding zone and extends over the components of the welding process to be monitored.

In applications where grids are arranged within the nozzle in superposed relation to one another for forming a flow of shielding gas the grids are preferably arranged in an offset position relative to one another so that meshes of upstream grids are overlapped by bridges forming meshes of downstream grids to form, in combination, a filter attenuating light flux emitted by components of the welding process.

The apparatus for gas-shielded arc welding according to the invention ensures monitoring of the process through a gas nozzle and makes it possible to obtain complete information on the condition of components participating in the welding process, such as electrode, welding arc, metal bath, as well as on deviations of parameters of the process from pre-set values. Permanent flow of shielding gas does not permit propagation of smoke and soot toward the optically transparent cover plate of the nozzle. The grids which are arranged in an offset position relative to one another within the nozzle provide for lowering the intensity of light radiation from the welding arc to a level acceptable for the TV transmission camera thus resulting in a lighting comfort in forming a process image. The arrangement of the TV camera lens at a distance from the gas nozzle selected according to the invention makes it possible to eliminate the grids from the composition of the image formed for a welding operator. All these advantages reduce the probability of formation of flaws in a welded joint and enable a high-performance process in the manufacture of products of thick plate materials (such as pressure vessels with a wall thickness up to 300 mm).

BRIEF DESCRIPTION OF THE DRAWINGS

The invention will now be described with reference to specific embodiments disclosed in conjunction with the accompanying drawings, in which:

FIG. 1 shows a longitudinal section of an apparatus for gas-shielded arc welding according to the invention;

FIG. 2 is ditto in a side elevation view (longitudinal section);

FIG. 3 is an enlarged view of a nozzle for feeding a shielding gas;

FIG. 4 is a plan view of grids with circular perforations;

FIG. 5 is a perspective view showing an embodiment of grids with rectangular perforations.

DESCRIPTION OF THE PREFERRED EMBODIMENTS

An apparatus for gas-shielded arc welding according to the invention comprises a mechanism 1 (FIGS. 1, 2) for guiding and feeding an electrode 2 to a welding zone 3, a nozzle 4 for feeding a shielding gas medium 5 and a TV transmission camera 6. At an end 7 of the nozzle 4, which is remote from the welding zone 3, is installed a cover plate 8 made of an optically transparent material. A lens 9 of a TV camera 6 is arranged above or spaced from the cover plate 8 coaxially with the nozzle 4, the distance "a" from the cover plate 8 to the lens 9 being selected in such a manner that a zone of sharpness 10 of the lens 9 is located beyond an edge 11 of the nozzle 4 which is adjacent to the welding zone 3 and extends over the components of the welding process (the electrode 2, a welding arc 12 and a weld 13 interconnecting workpieces 14) which are being controlled.

Metal grids 15, 16, 17 forming a gas flow are installed within the nozzle 4 in a superposed relation to one another. The grids 15–17 (FIG. 3) are arranged in an offset relation to one another in such a manner that meshes 18 of the upstream grid 15 are partly overlapped by bridges 19 between the meshes of the downstream grids 16, 17. The combination of the grids 15, 16, 17 thus forms an attenuating light filter which extends in the path of propagation of light flux from the welding arc 12 toward the lens 9 of the TV transmission camera 6. The grids may be either perforated with circular meshes 18 (FIG. 4) or braded with rectangular meshes (FIG. 5).

The apparatus for gas-shielded arc welding according to the invention functions in the following manner.

For conducting the welding process, the mechanism 1 for guiding and feeding the electrode 2 (FIG. 1) is lowered into a narrow welding groove 20 between the workpieces 14 to be welded together, and the gas nozzle 4 is positioned over the groove 20. The flow of the shielding gas medium 5 passing through the nozzle 4 shields the welding zone from air and also contributes to the removal of combustion products (not shown in the drawing) in the direction opposite to the direction of movement of the apparatus.

Observation and monitoring of the welding process and condition of its components—electrode 2, welding arc 12 and weld 13—are effected by means of the TV camera 6. Light flux carrying information on the performance of the process passes through the grids 15, 16, 17 installed within the nozzle 4 and through optically transparent cover plate 8 and is collected by the lens 9 of the TV camera 6.

Permanent laminar flow of the shielding gas medium 5 passing through the nozzle 4 prevents smoke and soot from propagating toward the cover plate 8. At the same time, components of the welding process (electrode 2, arc 12 and weld 13) are within the field of vision of the lens 9.

The grids 15, 16, 17 within the nozzle 4 (FIGS. 3, 4, 5) are arranged in such a manner that the meshes 18 of each upstream grid 15 are partly overlapped by bridges 19 of the grid 16 and the like results in a reduction of direct passage of light radiation and causes an attenuation of light flux emitted by the welding process. The distance "a" from the cover plate 8 (FIGS. 1, 2) of the nozzle 4 to the lens 9 of the TV camera 6 selected as described above ensures the location of the zone of sharpness 10 of the lens 9 beyond the edge 11 of the nozzle 4 adjacent to the welding zone 3. Therefore, the grids 15, 16, 17 installed within the nozzle 4 are eliminated from the composition of the image.

The possibility of permanent monitoring of the condition of the electrode 2, the behaviour of the welding arc 12 and the state of the weld 13 formed during the welding ensures timely detection of flaws—undercuts and cold welds—and makes it possible to remedy such troubles without interrupting the process. This enables an improvement of productivity in welding thick plate materials and quality of welded joints with a reduction of cost in the manufacture of intricate structures.

The invention may be used in any industry for welding thick plate materials and for making weld joints of large length, such as in the manufacture of pressure vessel casings.

We claim:

1. An apparatus for gas-shielded arc welding, comprising a mechanism for guiding and feeding an electrode to a welding zone, a nozzle for feeding a shielding gas medium to the welding zone and a TV transmission camera for realtime monitoring of the welding process, characterized in that a cover plate (8) made of an optically transparent material is provided at an end (7) of the gas nozzle (4) which is remote from the welding zone (3), and a lens (9) of the TV camera (6) is installed above the cover plate coaxially therewith, the distance ("a") from the cover plate (8) to the lens (9) being selected in such a manner that the zone (10) of sharpness of the lens (9) is located beyond the edge (11) of the nozzle (4) which is adjacent to the welding zone (10) and extends over the components of the welding process to be monitored wherein grids for forming a protective gas flow are installed within the nozzle in a superposed relation to one another in the direction of gas flow, said grids (15, 16, 17) being arranged in an offset relation to one another in such a manner that meshes (18) of an upstream grid (15) are partly overlapped by bridges (19) between meshes (18) of each downstream grid (16, 17) so that the combination of grids (15–17) forms a filter attenuating light flux emitted by the components of the welding process.

* * * * *